(12) United States Patent
Dennis et al.

(10) Patent No.: US 10,747,622 B2
(45) Date of Patent: Aug. 18, 2020

(54) EFFICIENT BACKUP, SEARCH AND RESTORE

(71) Applicant: SkyKick, Inc., Seattle, WA (US)

(72) Inventors: John Dennis, Seattle, WA (US); Evan Richman, Seattle, WA (US); Todd Schwartz, Seattle, WA (US); Bradley Younge, Denver, CO (US); Douglas Handler, Seattle, WA (US); Corey Brent Caldwell, Seattle, WA (US); Matthew Steven Hintzke, Seattle, WA (US); Christopher Rayner, Seattle, WA (US); Robert William Davis, Seattle, WA (US)

(73) Assignee: SKYKICK, INC., Seattle, WA (US)

( * ) Notice: Subject to any disclaimer, the term of this patent is extended or adjusted under 35 U.S.C. 154(b) by 743 days.

(21) Appl. No.: 15/087,930

(22) Filed: Mar. 31, 2016

(65) Prior Publication Data

US 2016/0292043 A1    Oct. 6, 2016

Related U.S. Application Data

(60) Provisional application No. 62/140,741, filed on Mar. 31, 2015.

(51) Int. Cl.
*G06F 11/14* (2006.01)
*G06F 16/951* (2019.01)
(Continued)

(52) U.S. Cl.
CPC .......... *G06F 11/1451* (2013.01); *G06F 11/14* (2013.01); *G06F 11/1464* (2013.01);
(Continued)

(58) Field of Classification Search
CPC ............ G06F 11/1451; G06F 2201/84; G06F 11/1464; G06F 16/951; G06F 11/14; G06F 16/245; G06F 16/184
See application file for complete search history.

(56) References Cited

U.S. PATENT DOCUMENTS

| 5,778,395 A | 7/1998 | Whiting et al. |
| 7,536,424 B2 | 5/2009 | Barzilai |

(Continued)

FOREIGN PATENT DOCUMENTS

| CN | 104102557 A | 10/2014 |
| WO | 2015/142676 A1 | 9/2015 |

OTHER PUBLICATIONS

"Rackspace Cloud Files API 1.0" [online], [retrieved on May 20, 2016]. Retrieved from the internet, URL https://developerrackspace.com/docs/cloud-files/v1/developer-guide/.
(Continued)

*Primary Examiner* — Alicia M Willoughby
(74) *Attorney, Agent, or Firm* — Kilpatrick Townsend & Stockton LLP

(57) ABSTRACT

A backup, search, and restore service is provided. The service can be achieved through a backup system, and a search and restore server. A user can be enabled to initiate a search request for one or more data items. A search can be performed by the search and restore server using metadata for the data items backed up by the backup system to return the one or more data items. The metadata for the data items can be generated by the backup system when data items are backed up by the backup system. The backup system may back up the data items on an incremental basis. The user can be enabled to select a data item in the one or more data items for restoration on the data system. Header information of the
(Continued)

selected data item can be obtained from the data system to determine whether the restoration is necessary.

18 Claims, 8 Drawing Sheets

(51) Int. Cl.
   *G06F 16/182* (2019.01)
   *G06F 16/245* (2019.01)

(52) U.S. Cl.
   CPC .......... *G06F 16/184* (2019.01); *G06F 16/245* (2019.01); *G06F 16/951* (2019.01); *G06F 2201/84* (2013.01)

(56) References Cited

U.S. PATENT DOCUMENTS

| | | | | |
|---|---|---|---|---|
| 8,255,366 | B1* | 8/2012 | Bagley | G06F 11/1469 |
| | | | | 707/646 |
| 8,666,944 | B2* | 3/2014 | Beatty | G06F 11/1451 |
| | | | | 707/679 |
| 8,775,377 | B1* | 7/2014 | Zhang | G06F 17/00 |
| | | | | 707/610 |
| 8,935,446 | B1 | 1/2015 | Shilane et al. | |
| 9,069,885 | B1* | 6/2015 | Moeller | G06F 11/1448 |
| 9,110,976 | B2 | 8/2015 | Bolgert et al. | |
| 2003/0046313 | A1* | 3/2003 | Leung | G06F 11/1469 |
| 2006/0117056 | A1* | 6/2006 | Havewala | G06F 17/30067 |
| 2007/0100913 | A1* | 5/2007 | Sumner | G06F 11/1453 |
| 2007/0266062 | A1* | 11/2007 | Young | G06F 11/1004 |
| 2010/0198797 | A1* | 8/2010 | Wideman | G06F 17/30156 |
| | | | | 707/692 |
| 2013/0346379 | A1 | 12/2013 | Loe | |
| 2013/0346563 | A1 | 12/2013 | Huang | |
| 2014/0074790 | A1* | 3/2014 | Berman | G06F 17/3007 |
| | | | | 707/649 |
| 2015/0067103 | A1 | 3/2015 | Karaoguz et al. | |
| 2015/0067109 | A1 | 3/2015 | Tang et al. | |
| 2015/0205674 | A1* | 7/2015 | Schroth | G06F 11/1458 |
| | | | | 707/649 |
| 2016/0110262 | A1* | 4/2016 | Nanivadekar | G06F 11/1469 |
| | | | | 707/654 |
| 2017/0180567 | A1* | 6/2017 | Sharma | H04M 15/8044 |

OTHER PUBLICATIONS

"Backup and Recovery in Configuration Manager" [online], [retrieved on May 20, 2016]. Retrieved from the internet, URL https://technet.microsoft.com/en-in/library/gg712697(d=printer).aspx.

* cited by examiner

EFFICIENT BACKUP, SEARCH AND RESTORE

CROSS-REFERENCES TO RELATED APPLICATIONS

This application claims benefit under 35 U.S.C. § 119(e), of U.S. Patent Application No. 62/140,741 filed Mar. 31, 2015 for "EFFICIENT CLOUD BACKUP OF SERVER" The entire disclosure of the above mentioned application is incorporated by reference for all purposes.

BACKGROUND

The disclosure generally relates to data storage and retrieval in computer networks. Specifically, the disclosure relates to enhanced methods and systems for backup, versioning, restoration, and retrieval of data for online messaging, collaboration, and data storage systems.

Data-back systems for backing up data storage associated with a user are generally known in the art. Data items such as files, email, calendar, contact management, collaboration, customer relationship management (CRM), customer service portals (CSP), and/or any other types of data items can be stored in the data storage and backed up by those systems. In implementations, those systems typically create restore points or snapshot views of the data storage in time, such that the user can restore to a previous restore point when desired. That is, those systems can create a restore point by backing-up the data storage at certain time point, and the restore point can be used by the user to restore data items in the data storage to that time point. However, this restoring process can be tedious and lengthy. Those systems typically restore entire data storage to the restore point even when the user only needs a few files to be restored.

Therefore, there is a need for efficient backup, search and restoration for data items. Embodiments of the invention address this, individually and collectively.

BRIEF SUMMARY

Embodiments can provide a data backup, search and restore service that enables a user to restore desired data items. In accordance with the disclosure, a search and restore interface can be implemented on a client computer associated with a user. Through the search and restore interface, the user can be enabled to initiate a search for one or more data items. For example, the user can be enabled to input a text string to specify search criteria to which the data items should match. A search can be then performed by comparing metadata information regarding individual data items with the search criteria. One or more data items matching the search criteria can be obtained as a result of the search, and metadata describing the one or more matching items can be presented to the user through the search and restore interface. The user can then be enabled to select at least one data item in the one or more data items for restoration on a data system.

In certain implementations, the data item on the data system can be restored by comparing the header information for the data item on the data system and that on the backup system. In those implementations, the search and restore server can be configured to determine whether the data item is to be restored on the data system based on a result of the comparison.

In accordance with the disclosure, data items stored on a data system can be efficiently backed-up through a backup system. The backup system can be configured to back up the data item individually or in a batch. The backup system can back up a given data item by storing the data item in one or more storage locations. Metadata information can be captured and stored by the backup system to summarize the backed-up data items.

In certain implementations, for backing-up data items on a particular data system, the backup system can be configured to send a request to the data system for headers of data items matching one or more criteria. The backup system can be configured to then receive from the data system a set of headers of the data items, compare the newly received headers with header information for the data items previously received, and determine from a result of the comparison a set of data items to be backed-up. The backup system can be configured to then send a request to the data system for the determined data items, and receive from the data system the requested data items.

Other embodiments are directed to systems and computer readable media associated with methods described herein.

A better understanding of the nature and advantages of embodiments of the present invention may be gained with reference to the following detailed description and the accompanying drawings.

BRIEF DESCRIPTION OF THE DRAWINGS

Some embodiments of the inventive subject matter are illustrated herein by way of example, and not limitation, in the figures of the accompanying drawings, in which.

TERMS

Figure 1:
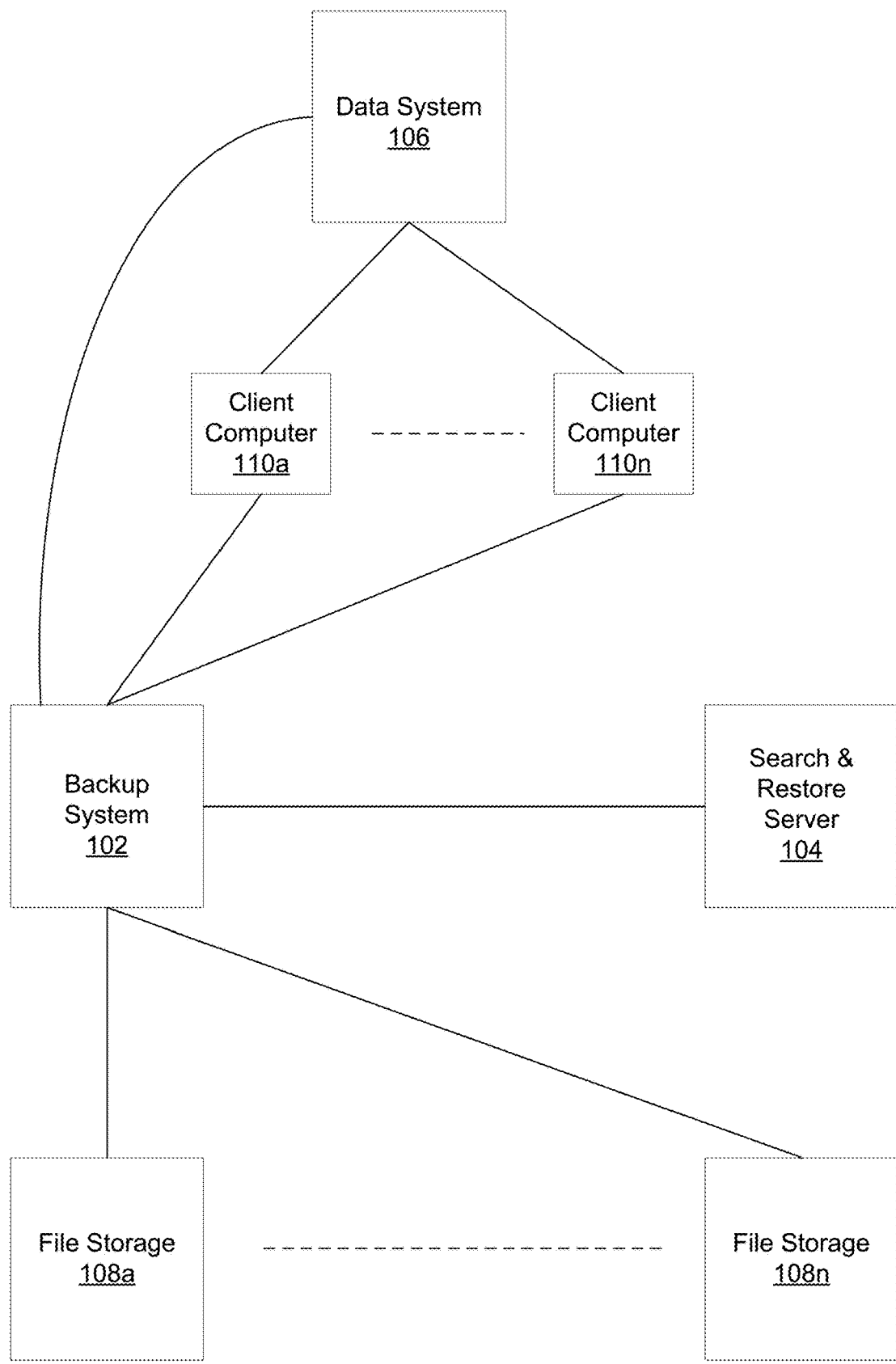
FIG. 1 illustrates one example of various components working together for efficient backup of data items in accordance with the disclosure.

Data items that can be backed-up, searched and restored in accordance with the disclosure can include file items, electronic mail items, and/or any other type of data items. A file item may be referred to a file resource on a file system for persistently storing information, which may be available to a computer program. An electronic mail item may be referred items implemented and provided by an electronic mail program. Examples of an electronic mail item can include an electronic mail message, a calendar item, a contact item, a task item, a contact item, a note item, just to name a few.

A data system is a system that can store data items for use by a user through the user's computer. Examples of a data system may include a file system, a network storage system, an electronic mail system, a cloud-based system, an application server and/or any other data systems. In implementations, the data system can be configured to include a data storage to store the data items, or the data system can be configured to store the data items on one or more remote storage locations operatively connected to the data system, for example a remote data center, a remote cloud server or any other types of remote data storage.

An electronic mail system (email system herein) is a system that facilitates exchanging digital messages between users. Examples of an email server can include Microsoft Exchange Server®, Lotus Notes® server, Gmail server, Unix mail server, just to name a few. An electronic mail client application (email client herein) is a computer program executed on the client computer of a user to enable a user to send and receive digital messages or emails. Emails are stored in the user's mailbox on the remote email server until the user's email client requests them to be downloaded to the user's computer. The email client can be set up to connect to multiple mailboxes at the same time and to request the download of emails either automatically, such as at pre-set intervals, or the request can be manually initiated by the user. The email client can contain a user interface to display and edit text. The email client can be set up automatically to connect to the user's mail server. Examples of an email client can include Microsoft Outlook®, Lotus Notes client, Unix Pine, Google web mail client, just to name a few.

Metadata is data that describes one or more data items. Metadata for a particular data item can summarize basic information about the data item, such as one or more locations where the data item is stored during the backup process, a timestamp associated with the data item, a size of the data item, one or more keywords in the data item, a category of the data item and/or any other suitable information that can summarize the data item.

Header information, or header, of a data item may be referred to as supplemental data placed at the beginning of a block of data in the data item. A header of the data item may include information describe the data in the data item, such as a size of the data, last modification time of the data, a name of the data item (e.g., a file name, a task name, a contact name), just to name a few. The header of the data item can provide a list of technical details about the data item. For example, when the data item is an email message, the header information can provide information specifying a sender of the message, a program used to compose the message, one or more email systems the message passed through on its way to the recipient, and/or any other information.

DETAILED DESCRIPTION

Embodiments can provide a backup, search and restoration service enabling a user to restore one or more data items on a data system. The data system can be configured to provide services such as messaging (email, calendar, contact management), online collaboration, CRM, CSP and online storage. Some examples of these data systems can include, for example, Office 365 Exchange, Office 365 SharePoint, Office 365 Project, OneDrive, Box, Microsoft Dynamics CRM, and Salesforce. Embodiments can enable a user to search and restore one or more data items on the data system. A user interface can be provided and implemented on a computer associated with the user. The interface can enable the user to initiate a search for one or more data items matching a search criteria specified by the user through the interface. A search can be then performed by comparing metadata information regarding individual data items with the search criteria. One or more data items matching the search criteria can be obtained as a result of the search, and metadata describing the one or more matching items can be presented to the user through the search and restore interface. The user can then be enabled to select at least one data item in the one or more data items for restoration on a data system. The data item on the data system can be restored by comparing the header information for the data item on the data system and that on the backup system. In those implementations, the search and restore server can be configured to determine whether the data item is to be restored on the data system based on a result of the comparison.

In certain embodiments, data items stored on a data system can be efficiently backed-up through a backup system. The backup system can be configured to back up the data item individually or in a batch. The backup system can back up a given data item by storing the data item in one or more storage locations. Metadata information can be captured and stored by the backup system to summarize the backed-up data items.

With the operations for efficiently backing-up, searching and restoring one or more data items having been generally described, an architecture of various systems and components working together to achieve such operations will be described and illustrated in the section below.

I. Backup, Search and Restore System

The efficient backing-up, searching and restoring data item service in accordance with the disclosure can be achieved with a variety of system architectures, which may include a plurality of client computers, one or more data systems, one or more servers configured to provide a backup service, one or more servers configured to provide a search service, one or more servers configured to provide a restore service, one or more remote data storage servers, and/or any other components. It should be understood that functions or operations implemented by separate servers or systems in the embodiments described herein can be combined and implemented by a single server or system in some other embodiments; or that functions or operations implemented by a single server or system in the embodiments described herein can be separately implemented by different servers and/or systems in some other embodiments.

FIG. 1 illustrates one example of various components working together for efficient backing-up, searching and restoring data items in accordance with the disclosure. In this example, a backup system 102, a search and restore server 104, a data system 106, a plurality of file storage systems 108*a-n*, and a plurality of client computers 110*a-n* are shown for achieving the efficient backing-up, searching, and restoring data items in accordance with the disclosure.

The backup system 102 can be configured to perform operations to backup data items on the data system 106. The operations performed by the backup system can include managing the metadata information regarding each of the data items in a memory of the server. The operations performed by the backup system can include taking a snapshot view of the data system by obtaining header information for the data items from the data system 106. The operations performed by the backup system can include performing header information for the data items to determine one or more data items to be backed up. The operations performed by the backup system can include determining one or more data items currently backed-up to be deleted due to changes on the data system 106. The operations performed by the backup system can include providing an interface for implementation on a client computer 110, such as client computer 110*a* or 110*n*, and/or any other operations.

The search and restore server 104 can be configured to perform operations to search and restore one or more data items on the data system 106 in response to a search request from a client computer 110, such as client computer 110*a* or 110*n*. The search and restore operations performed by the search and restore server 104 can include providing a user interface that enables a user to specify one or more criteria for initiating the search request. In some examples, the search and restore operations performed by the search and restore server 104 can include performing a search of the metadata information managed by the backup system 102 to identify the one or more matching items, thereby obtaining a result set including a first data item. In some examples, the search and restore operations performed by the search and restore server 104 can include providing first metadata regarding a first data item to a client computer associated with the user, such as 110*a* or 110*n*, for presentation to the user. In some examples, the search and restore operations performed by the search and restore server 104 can include receiving, from the client computer, a restoration request indicating to restore the first data item to the data system. In some examples, the search and restore operations performed by the search and restore server 104 can include performing an analysis to determine which data items or which versions of the data items requested by the user are to be restored on the data system 106, and/or any other operations.

The data system 106 can be configured to store data items for use by the user through the client computer 110, such as client computer 110*a* or 110*n*. Examples of a data system 106 may include a file system, a network storage system, an electronic mail system, a cloud-based system, an application server and/or any other data systems. The data system 106 can provide one or more services including messaging (email, calendar, contact management), online collaboration, CRM, CSP and online storage. Some examples of these data systems can include, for example, Office 365 Exchange, Office 365 SharePoint, Office 365 Project, OneDrive, Box, Microsoft Dynamics CRM, and Salesforce. In implementations, the data system 106 can be configured to include a data storage to store the data items; or the data system 106 can be configured to store the data items on one or more remote storage locations operatively connected to the data system 106, for example a remote data center, a remote cloud server or any other types of remote data storage.

The file storage 108*a* to 108*n* can be configured to store data items for the backup service provided by the backup system 102. In some implementations, the backup system 102 may be configured to store a particular data item entirely on a file storage, such as file storage 108. In some other implementations, the backup system 102 may be configured to divide the data item into multiple pieces and store the multiple pieces across one or more different file storage 108*a* to 108*n*. In those implementations, the metadata information regarding the data item may include information indicating how the data item can be assembled from the multiple pieces stored on the file storage 108*a* to 108*n*.

The client computers 110*a*-*n* can be configured to present one or more data items requested by an associated user; to implement an interface to enable a user to initiate a search request for one or more data items; initiate a restoration request to enable the user to request one of the one or more data items to be restored; and/or any other operations. The client computers 110*a*-*n* can include a mobile device such as an tablet, a smart phone, a phablet, and/or any other type(s) of mobile devices; a laptop computer, a desktop computer, a netbook, a mainframe computer, a terminal, a game console, a network console, and/or any other type(s) of client computer.

It should be understood the various devices, systems and servers shown in FIG. 1 can be configured with each other over a computer network or locally. For example, the client computer 110*a* or 110*n* can be configured to communicate with the data system 106 through an intranet provided by a business; the backup system 102 can be configured to communicate with data system 106 through the internet; and the backup system 102 can configured to communicate with search and restore server 104 via a cable.

Figure 2:
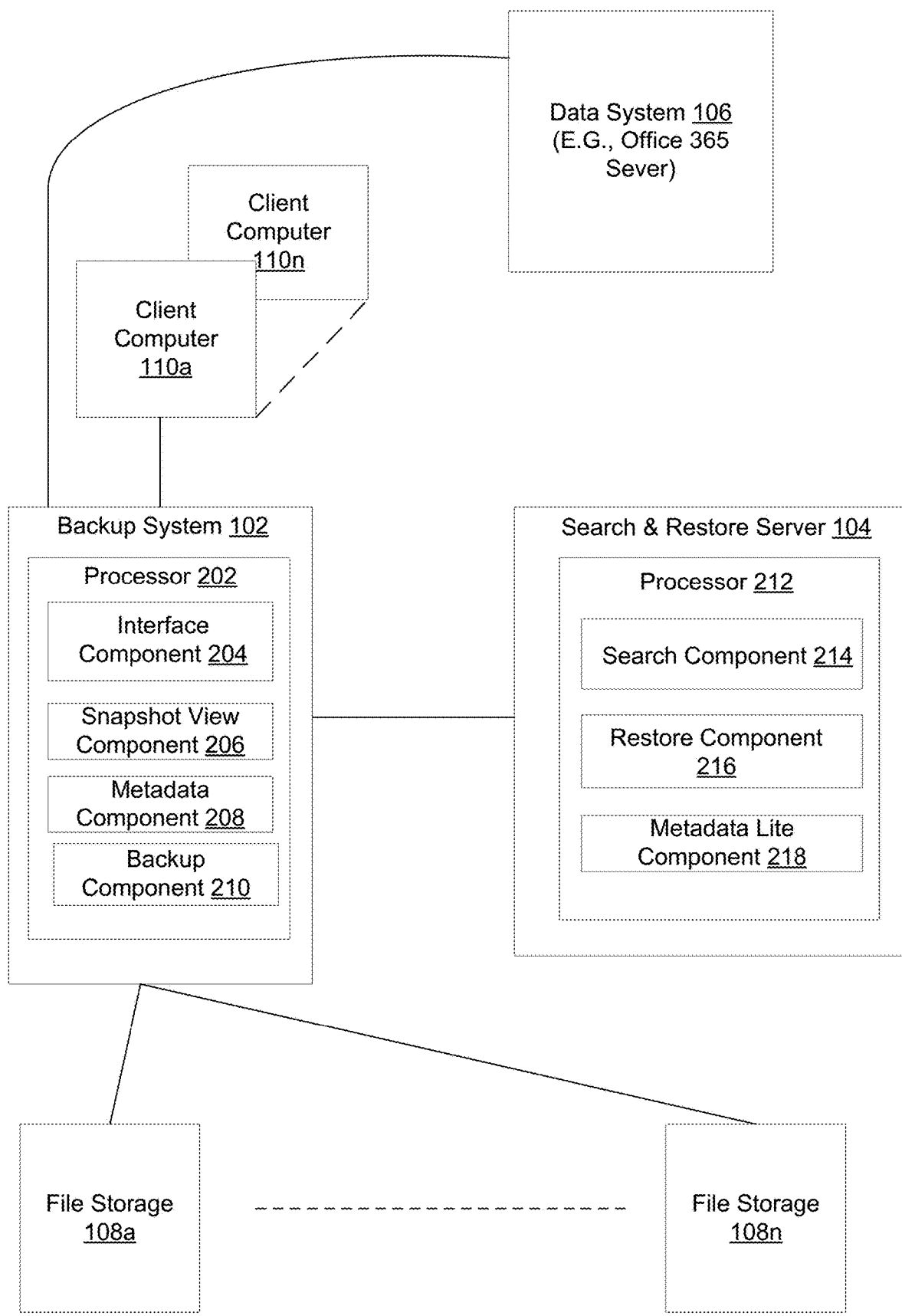
FIG. 2 illustrates an exemplary implementation of a search and restore system, and an exemplary implementation of a backup system shown in FIG. 1.

FIG. 2 illustrates an exemplary implementation of a search and restore server 104 and an exemplary implementation of a backup system 102 shown in FIG. 1. As shown, in some implementations, as in the example shown in FIG. 2, the backup system 102 can include one or more of a processor 202 configured to execute program components, which can include an interface component 204, a snapshot view component 206, a metadata component 208, a backup component 210, and/or any other components.

Figure 7A:
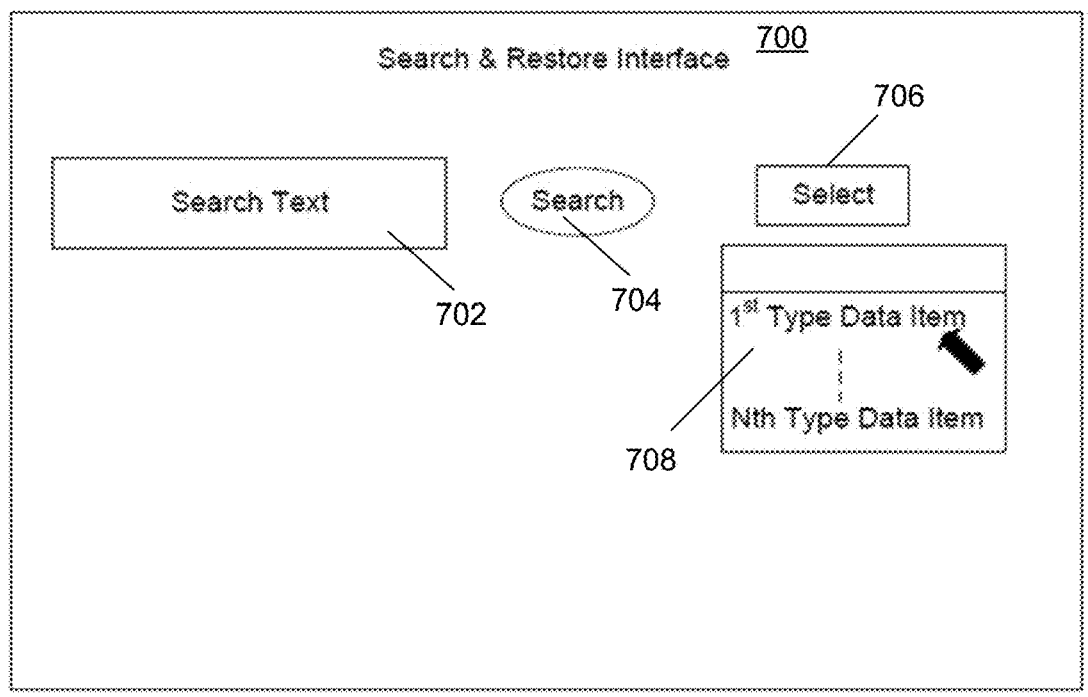
FIG. 7A illustrates an exemplary interface enabling a user to initiate a search for one or more data items matching a search criteria specified by the user.
Figure 7B:
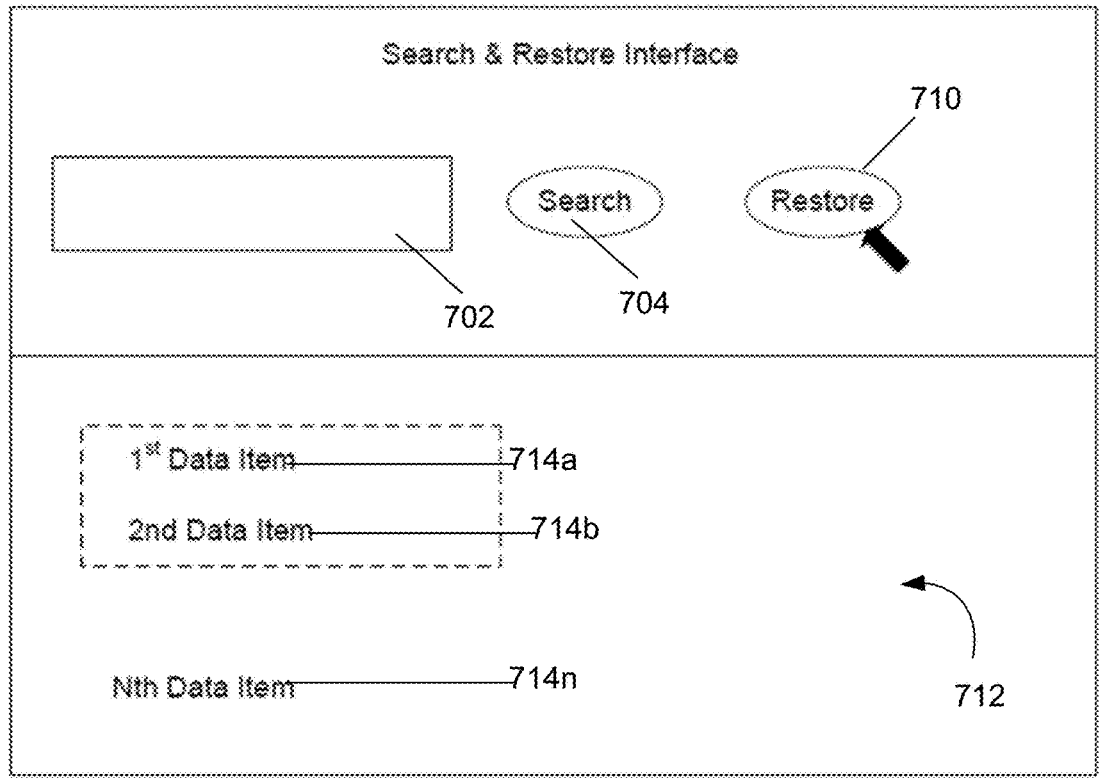
FIG. 7B illustrates another exemplary interface enabling a user to restore one or more data items on the data system shown in FIG. 1.

The interface component 204 can be configured to provide user interfaces for implementation on client computers 110*a* to 110*n*. The user interfaces provided by interface component 204 may include a graphical user interface (GUI), a voice interface, a gesture interface, and/or any other type of user interface. The user interfaces provided by the interface component 204 may include field controls enabling a user to specify one or more criteria for initiating a request to search for one or more matching data items. An example of such a user interface is illustrated in FIG. 7A. The user interfaces provided by the interface component 204 may include field controls enabling a user to initiate a restoration request indicating to restore one or more data items on the data system 106. An example of such a user interface is illustrated in FIG. 7B.

The snapshot view component 206 can be configured to take a snapshot view of the data system 106, which can represent a current state of the data system 106. In some implementations, taking the snapshot view of the data system 106 can include obtaining header information for the data items on the data system 106. For a particular data item on the data system 106, the header information include information describing the data in the data item, such as a size of the data, last modification time of the data, a name of the data item (e.g., a file name, a task name, a contact name), and the like. In those implementations, the header information for the data items on the data system 106 may be readily provided by the data system 106. However, this is not necessarily the only case. In some implementations, the data system 106 may be configured to generate the header information for the data items dynamically on request. In any case, a snapshot view of the data system 106 can be scheduled and stored in a daily job queue. In one example, the snapshot view of the data system 106 is scheduled to be taken six times throughout a day.

As mentioned, the snapshot view of the data system 106 can represent a current state of the data system 106. For example, if the data system 106 is an electronic mail system, the data system 106 may store email messages, calendar items, task items, contact items, and/or any other data items for individual users. In that example, header information for those data items may be readily provided by the data system 106. For instance, the header information for an email message can include information indicating a sender of the email message, a subject of the email message, a date and time when the email message is received, a size of the email message, and/or any other header information provided by the data system 106. As another example, if the data system 106 is a file system, the data system 106 may store files as data items. In that example, header information for a particular file may indicate a size of the file, a filename of the file, a data and time when the file is last modified or created, and/or any other header information for the particular file.

In some implementations, the snapshot view component 206 can be configured to take a full snapshot view or a fast snapshot view of the data system 106. A full snapshot view of the data system 106 may contain header information for all of the data items on the data system 106 when the full snapshot view of the data system 106 is taken. A fast snapshot view of the data system 106 may contain header information for only the data items that have been modified, added or deleted since the last full snapshot view was taken. In those implementations, the snapshot view component 206 can be configured to determine whether a current full snapshot view of data system 106 as maintained by the backup system 102 was taken before a predetermined time period, e.g., a day. For example, the snapshot view component 206 can be configured to take a full snapshot view if the existing full snapshot view was taken more than one day ago; and to take a fast snapshot view if the existing full snapshot view was taken less than one day.

In some implementations, the snapshot view component 206 can be configured to take the full snapshot view of the data system 106 in a hierarchical fashion. For example, the snapshot view component 206 can be configured to obtain headers for the data items at a first level (e.g. root level directories and/or file(s), email inbox, master calendar), at a second level (e.g., second level directories and/or file(s), email messages and/or folders, calendar items), at a third level (e.g., third level directories and/or file(s), email messages in the folders and/or subfolders of the folders), task items in the calendar items), and so on.

In some implementation, the snapshot view component 206 can be configured to take the fast view of the data system 106 also in a hierarchical fashion. For example, the snapshot view component 206 can be configured to obtain headers for the data items at a first level (e.g. root level directories and/or file(s), email inbox, master calendar) that have been updated (e.g. modified, deleted or added) since the last full snapshot view was taken, at a second level (e.g., second level directories and/or file(s), email messages and/or folders, calendar items) that have been updated since the last full snapshot view was taken, at a third level (e.g., third level directories and/or file(s), email messages in the folders and/or subfolders of the folders) that have been updated since the last full snapshot view was taken, and so on.

The metadata component 208 can be configured to manage metadata for data items that have been backed up by the backup system 102. The metadata for a particular data item can summarize basic information about the data item, such as one or more locations where the data item is stored during the backup process, a timestamp associated with the data item, a size of the data item, one or more keywords in the data item, a category of the data item and/or any other suitable information that can summarize the data item. Managing metadata for the data items may include generate metadata for a new data item to be backed up, modifying metadata for an existing data item that have been modified at the data system 106 (e.g., size change, location change, and so on), deleting metadata for a data item that has been deleted on the data system 106, updating and maintaining a master index of metadata for the data items backed up by the backup system 102, obtaining metadata for a specific data item backed up by the backup system 102, and/or any other operations. As illustration, the metadata component 208 can be configured to generate metadata for the new data item before storing the new data item on one or more file storage 108a-n. The metadata component 208 can be configured then add the newly generated metadata the master index so that the new data back item can be efficiently accessed.

In some implementations, the metadata component 208 can be configured to compare header information regarding a particular data item on the data system 106 with the metadata for that data item on the backup system to determine whether the metadata for that data item needs to be updated. For example, if a particular file on the data system 106 has been modified, the metadata component 208 can capture such a change and update the metadata for that file to reflect the change—e.g., by updating the file size information in the metadata. The metadata component 208 can also be configured to add metadata for a data item that is newly created on the data system.

In implementations, the metadata component 208 can be configured to store the metadata for the data items locally on a storage of the backup system 102. For example, the metadata component 208 can be configured to store metadata information for a data item to be backed up on a local storage of the backup system 102. However, this is not necessarily the only case. In some implementations, the metadata component 208 can be configured to store metadata information for the data item on one or more file storage 108, such as file storage 108a-n.

The backup component 210 can be configured to compare header information header information for the data items in the current snapshot view and those in the last snapshot view to determine one or more data items to be backed up. As illustration, the header information for a given data item on the data system 106 may indicate a size of the data item, a date and time of the data item, and/or any other identifying information that are dynamically updated when the data item is modified. In one implementation, a hash representing a combination of multiple data item attributes (such as size, date and time, and other information) may be included in the header information for the data item.

For example, by comparing the header information, it can be determined whether one or more attributes, such as size or date and time, have changed by such a comparison. As another example, it can be determined that a data item has been added to the data system 106. If it is determined that a change to the data item or the addition of the data item has taken place as indicated by a result of the comparison, the backup component 210 can be configured to download the data item. In implementations, the data items can be versioned, and the backup component 210 can be configured to download the current version of the data item on the data system 106 and replace the previous version of the data item with the current version of the data item.

In some implementations, the backup component 210 can be configured to divide a given data item that is to be backed up into multiple parts. In those implementations, the multiple parts of the given data item can be stored on one or more file storage 108a to 108n. An identification of each of the multiple part can be given by the backup component 210 to indicate a position of the part with respect to the entire data item. For example, a first part of the data item can be given an identification "part 1: filename of the data item", a second part of the data item can be given an identification "part 2: filename of the data item", a third part of the data item can be given an identification "part 3: filename of the data item", and so on.

In some implementations, the backup component 210 can be configured to encrypt and compress the data items when storing the data items on the file storage 108a-108n. Conventional encryption and compression algorithms can be used. An exemplary process for encrypting and compressing the data items will be described in FIG. 6.

With the exemplary implementation of the backup system 102 having been described, an exemplary implementation of the search & restore server 104 will be provided. As shown, the search & restore server 104 can include one or more of a processor 212 configured to execute program components, which can include a search component 214, a restore component 216, a metadata lite component 218, and/or any other components.

The search component 214 can be configured to perform a search of the metadata information to identify the one or more matching data items that match one or more criteria specified by a user through a search request, thereby obtaining a result set. For example, the user search request may search for data item(s) from a particular sender. In some implementations, as in the implementation shown in FIG. 2, the search component 214 can receive the search request from the client computer 110, such as 110a or 110n, via the backup system 102. That is, the backup system 102, via the interface component 204, can first receive the search request from the client computer 110, and then forward the search request to the search and restore server for execution. However, this is not necessarily the only case. In some other implementations, the search component 214 can be configured to receive the search request directly from the client computer 110. After receiving such a request, the search component 214 can generate instructions to search metadata information managed by metadata component 208, and obtain a result set. The result set can contain metadata for one or more data items that match the search criteria (data items from a particular sender). The search component 214 can be configured to provide the metadata for the data items in the result set to the client computer for presentation to the user.

The restore component 216 can be configured to receive a restoration request indicating to restore a particular data item on the data system 106, and generate and send instructions to the backup system 102 to restore the data item on the data system 106. To achieve this, the restore component 216 can be configured to obtain, from the data system 106, header information for the requested data item, and obtain, from the backup system, metadata information for the requested data item. The restore component 216 can be configured to then compare the obtained header information and the metadata information for the data items. Based on a result of the comparison, the restore component 216 can be configured to determine whether a previous version of the data item needs to be restored from the backup system 102 onto the data system 106. When the previous version of the requested data item is to be restored on the data system 106, the restore component 216 can be configured to send an instruction to the backup system 102 to effectuate the restoration of the requested data item on the data system.

In some implementations, the restore component 216 can be configured to determine whether the data item is specifically requested to be restored by the user. When the restore component 216 determines that the restoration request for the data item is specifically requested, the restore component 216 can be configured to restore the requested data item from the backup system 102 onto the data system 106 even if the requested data item exists on the data system. The user can specifically request the data item to be restored when the user only selects that item to be restored in the user interface. On the other hand, the user can request the data item to be restored in a batch, i.e., not specifically, when the user selects an entire container, for example an email inbox or a file folder, to be restored, wherein the container comprises the data item. As illustration, the user may request his/her email inbox, which can include a particular email message, to be restored. This can be considered as a batch restoration request. On the other hand, the user may request, specifically, that email message to be restored, which can be considered a specific restoration request.

As another illustration, the user may request a file folder, which can include a particular file, to be restored. This can be considered as a batch restoration request. The user can also request, specifically, the file to be restored, which can be considered as specific restoration request. In response to a specific restoration request, the restore component 216 can be configured to restore a version of the requested data item from the backup system 102 onto the data system 106 regardless whether a version of the requested data item has already existed on the data system 106. For example, if the user specifically requests an email message with a particular subject to be restored and the data system 106 has that message, the restore component 216 can be configured to still restore the backed up version of that message from the backup system 102 onto the data system 106 without removing the version on the data system 106.

The metadata lite component 218 can be configured to maintain a sub-index of the metadata managed by the backup system 102 and to facilitate access to the metadata using the sub-index. Maintaining the sub-index of the metadata by the metadata lite component 218 can include synchronizing with master index of the metadata maintained by the backup system 102 periodically, updating the sub-index of the metadata according to the master index, and/or any other operations. The metadata lite component 218 can be configured to obtain access to the metadata using the sub-index and providing the metadata to the search component 214 for performing the search as mentioned above. For example, the search component 214 can be configured to employ the metadata lite component 218 to gain access to the metadata stored on the file storage 108a-n.

It should be understood the function and operations attributed to various components of the backup system 102, and the search and restore server 104 described above are merely illustrative. In some other embodiments, some of these components can be combined or further divided. It should also be understood the architectural arrangement of the backup system 102, and search and restore server 104 described above is also illustrative. In some other examples, the backup system 102, and search and restore server 104 may be combined as one system. In some still some other examples, the search and restore server 104 described above may be achieved through separate servers, e.g., a search server and a restore server. In yet some other examples, the backup system 102 may comprise multiple servers implementing the components described above as attributed to the backup system 102. For instance, the backup system 102 may comprise a web server implementing the interface component 204, a backup server implementing the backup component 210, a data management server implementing the snapshot view component 206 and the metadata component 208.

II. Storage and Restoration Operations

With various exemplary components for achieving efficient back up, search and restore service in accordance with the disclosure having been generally described, this section will provide some details about operations that can be implemented by those components.

A. Obtaining Data Items and Metadata

Figure 3:
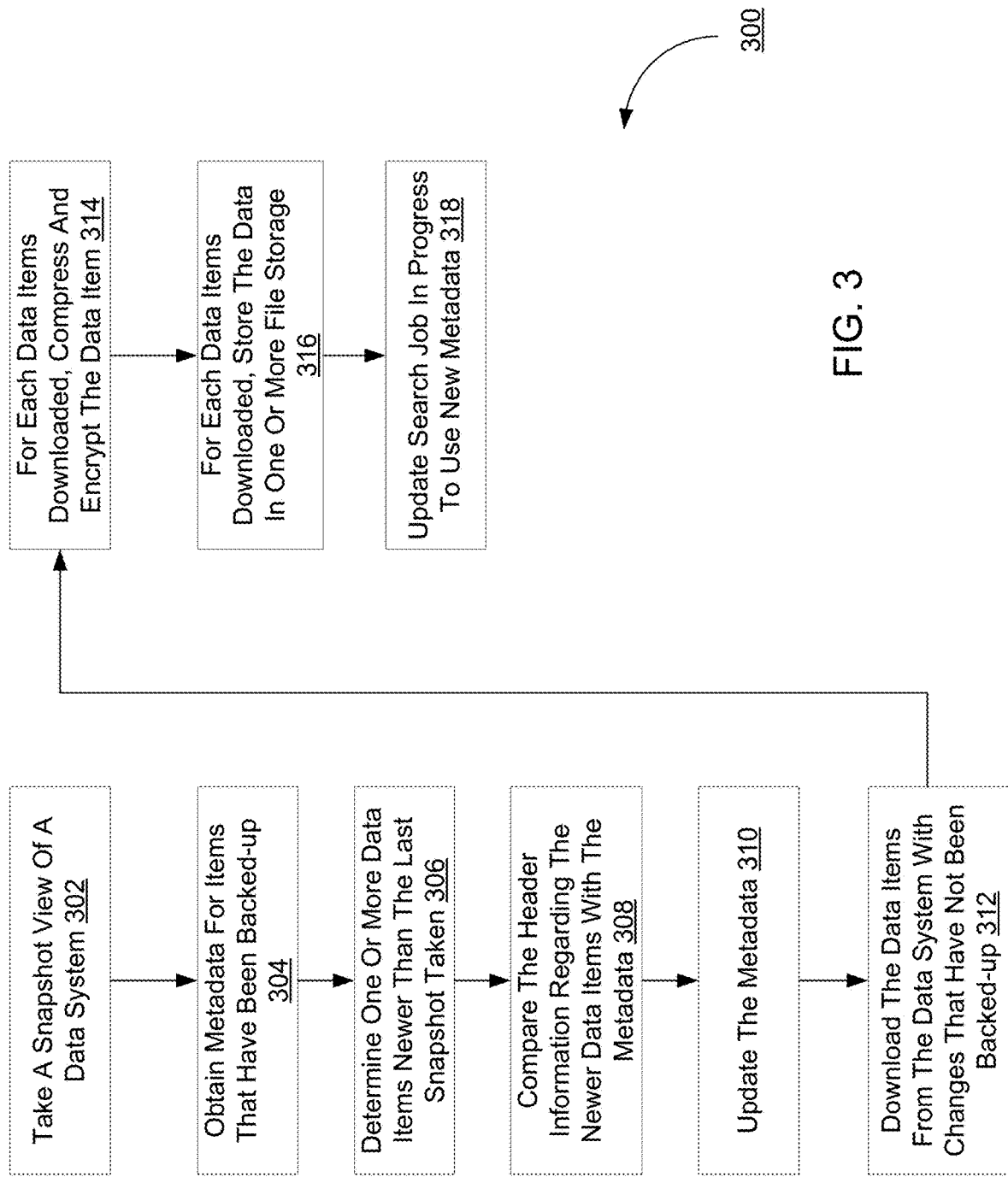
FIG. 3 illustrates an exemplary method for backing-up one or more data items in accordance with the disclosure.

Attention is now directed to FIG. 3, where an exemplary method 300 for backing-up one or more data items in accordance with the disclosure is illustrated. The operations of method 300 presented below are intended to be illustrative. In some embodiments, method 300 may be accomplished with one or more additional operations not described and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At 302, a snapshot view of a data system can be taken. The snapshot view taken at 302 can represent a current state of the data system. In some implementations, taking the snapshot view of the data system at 302 can include obtaining header information for the data items on the data system. In some exemplary implementations, operations involved in 302 can be performed by a snapshot view component the same as or substantially similar to the snapshot view component 206 described and illustrated herein.

At 304, metadata for data items that have already been backed up can be obtained. The metadata obtained at 304 can summarize basic information about the data items, such as one or more locations where the data items are stored during the backup process, a timestamp associated with the data items, a size of the data items, one or more keywords in the data items, a category of the data items and/or any other suitable information that can summarize the data items. In some exemplary implementations, operations involved in 304 can be performed by a metadata component the same as or substantially similar to the metadata component 208 described and illustrated herein.

At 306, one or more data items that are newer than the last snapshot view taken can be determined. This can involve comparing the current snapshot view taken 302 and the last snapshot view. These data items can include data items that have been modified, added, or deleted on the data system since the last snapshot view was taken. In some exemplary implementations, operations involved in 306 can be performed by a backup component the same as or substantially similar to the backup component 210 described and illustrated herein.

At 308, the header information for the data items determined at 306 can be compared with the metadata information obtained at 304 to determine metadata for one or more data items on the backup system need to updated. In some exemplary implementations, operations involved in 308 can be performed by a metadata component the same as or substantially similar to the metadata component 208 described and illustrated herein.

At 310, metadata for the one or more data items are updated as determined by 308. In some exemplary implementations, operations involved in 310 can be performed by a metadata component the same as or substantially similar to the metadata component 208 described and illustrated herein.

At 312, data items determined at 306 can be downloaded from the data system. In some exemplary implementations, operations involved in 312 can be performed by a backup component the same as or substantially similar to the backup component 210 described and illustrated herein.

At 314, each data items downloaded at 312 can be encrypted and compressed. An exemplary process for encrypting and compressing the data items will be described in FIG. 6. In some exemplary implementations, operations involved in 314 can be performed by a backup component the same as or substantially similar to the backup component 210 described and illustrated herein.

At 316, each data items that have been downloaded, encrypted and compressed can stored on file storage. In some exemplary implementations, operations involved in 316 can be performed by a backup component the same as or substantially similar to the backup component 210 described and illustrated herein.

At 318, one or more search jobs in progress can be updated with the metadata updated at 310. For example, a search job in response to a user search request for one or more data items matching user specified criteria may be in progress when the metadata is updated at 310. As described above, such a search job examines the metadata to determine a result set, and the search job needs to be updated when the metadata is updated. In implementations, the search job can be suspended temporarily when the metadata is being updated at 310 or a configuration file of the search job can be updated to use the modified metadata. In some exemplary implementations, operations involved in 318 can be performed by a backup component the same as or substantially similar to the backup component 210 described and illustrated herein.

Figure 4:
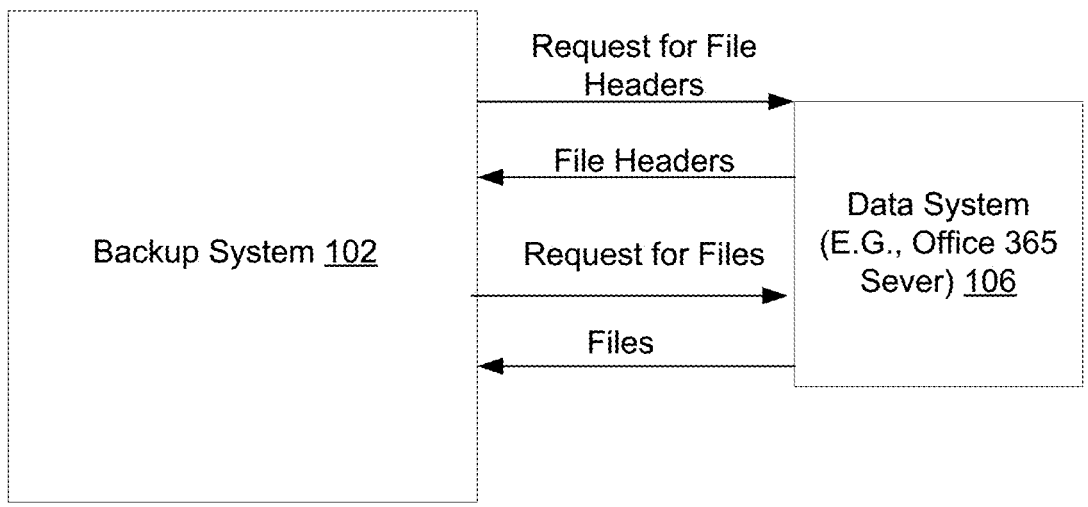
FIG. 4 illustrates one exemplary implementation of the method illustrated in FIG. 3.

FIG. 4 illustrates one exemplary implementation of method 300 by the backup system 102 shown in FIG. 1. In FIG. 4, the backup system 102 sends a request to the data system 106 for header information of files matching a specified set of criteria. The backup system 102 can receive from the data system 106 file headers matching the set of one or more criteria. The header can be used to retrieve a system-specific identifier for the file and its modified date. The backup system can analyze the headers received to determine a set of files to request by analyzing the headers. The header can be used to compare the live file to files in the backup medium and to recognize if any specific files have gone missing since the last snapshot view taken. The backup system 102 can then send a request to the data system 106 for the files. The data system 106 can respond with the requested files.

As mentioned above, the backup system 102 can be configured to handle versioned backup. The backup system 102 may request header information from the data system and look at the data stored and its header information and use the header information to compare against the data stored in the backup to see what is already stored and what data has newer versions available. This can be done by analyzing data stored in headers to look for the revision number, variation number or similar of the last updated date for items stored.

In implementations, the backup system 102 may roll recursively through a folder structure of a data system 106. For example, the backup system 102 may enumerate the top of a folder and then scroll recursively folder by folder. The backup system 102 may choose to only ask for a certain number file headers per folder or per request. For example, when recursively scrolling through a folder structure, the backup system 102 may ask for a batch of 100 file headers. If there are more than 100 files in a folder, then the backup system may cycle through a folder batch by batch. If there are fewer than 100, then the backup system may ask for more file headers from the next folder to be searched. Once a list of items is identified for which there are newer versions available, those files to be retrieved can similarly be requested. The requests for the matching files may be for individual files or batched.

The request for file headers may ask for the first set number of files that fit a particular set of criteria. The request may choose to specify to ignore hidden files or other specific system files as well. The request may ask for files added, modified or deleted since a certain time, for example the last 4 hours or day. Queries can consist of just those files updated in over the last 4 hours, or a fuller scan for all changes, including deletes and additions in the last 24 hours.

B. Enabling a User to Search and Restore a Data Item

Figure 5:
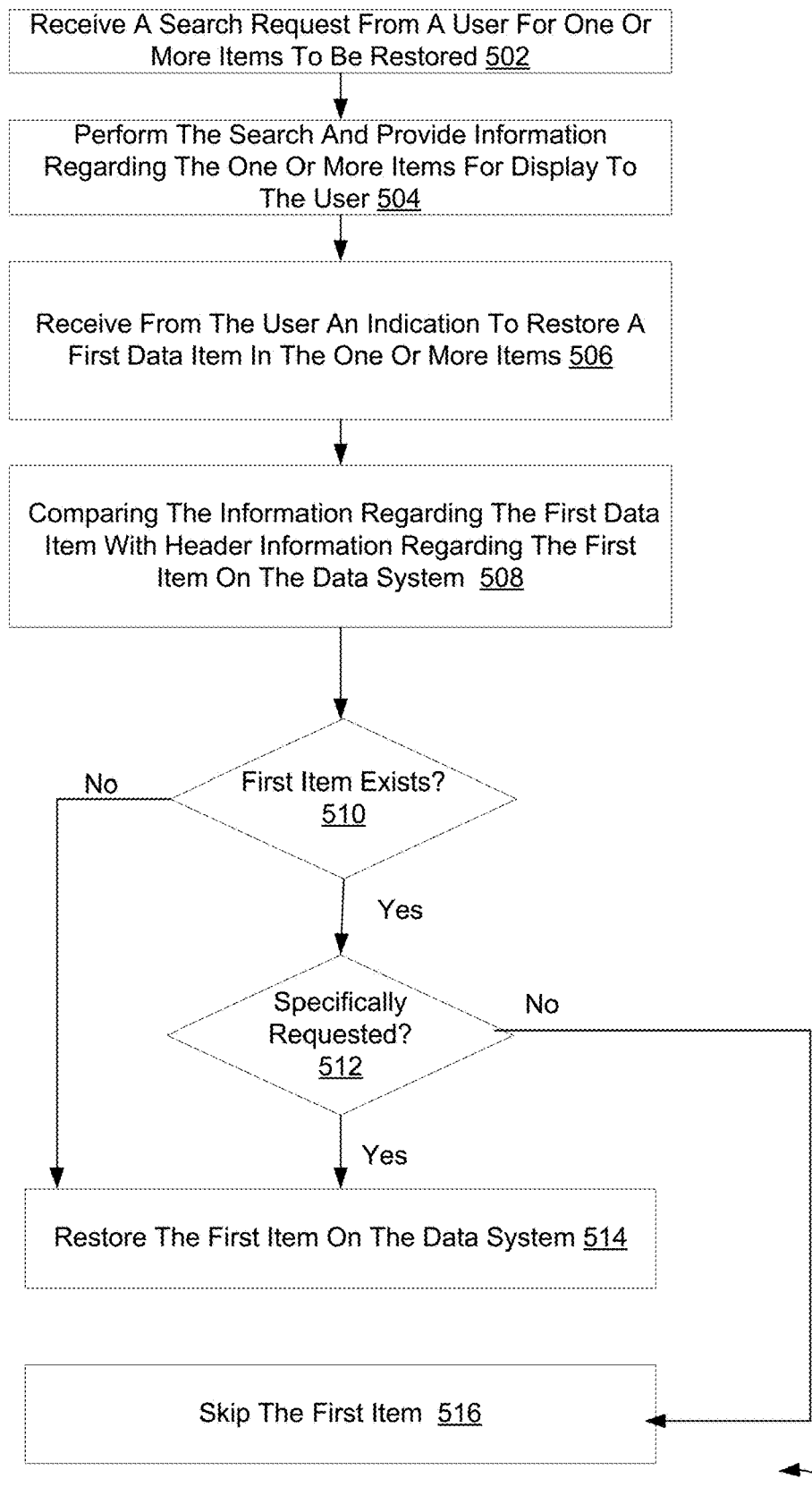
FIG. 5 illustrates one exemplary method for enabling a user to search and restore one or more data items.

FIG. 5 illustrates one exemplary method 500 for enabling a user to search and restore one or more data items. In some embodiments, method 500 may be accomplished with one or more additional operations not described and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At 502, a search request can be received from a user. The search request from the user can specify one or more search criteria for one or more data items. For example, the search request can specify the user is looking for email messages with particular subject, particular content, from a particular sender, and so on. As another example, the search request can specify the user is looking for a set of files with particular content or created after a certain time and date. In some exemplary implementations, operations involved in 502 can be performed by a backup component the same as or substantially similar to the backup system 102 described and illustrated herein.

At 504, a search can be performed to obtain one or more data items matching the searching criteria specified in the search request received at 502. The search performed at 504 can involve searching metadata information managed by the backup system for the one or more matching items. At 504, the metadata for the one or more matching items can be provided to a client computer for display to the user. In some exemplary implementations, operations involved in 504 can be performed by a search component the same as or substantially similar to the search component 214 described and illustrated herein.

At 506, an indication to restore a particular data item in the one or more matching items can be received from the user. For example, the indication received at 506 can indicate that the user desires to restore a particular email message from a specific sender. In some exemplary implementations, operations involved in 506 can be performed by a restore component the same as or substantially similar to the restore component 216 described and illustrated herein.

At 508, header information for the data item requested at 506 can be obtained from the data system and compared with the header information for the data item obtained from the previous snapshot view. This comparison can be used to determine whether the data item requested at 506 exists on the data system. In some exemplary implementations, operations involved in 508 can be performed by a restore component the same as or substantially similar to the restore component 216 described and illustrated herein.

At 510, a decision can be made whether data item requested at 506 exists on the data system. As shown, in the case when it is determined that the data item requested at 506 does not exist on the data system, the process proceeds to 514, where the requested data item is restored on the data system. As also shown, in the case when it is determined that the data item requested at 506 exists on the data system, the process proceeds to 512 for further processing. In some exemplary implementations, operations involved in 510 can be performed by a restore component the same as or substantially similar to the restore component 216 described and illustrated herein.

At 512, a decision can be made whether the restoration request for the data item as received at 506 is a specific request. As mentioned above, the restoration request can be a specific request when the user when the user only requests that item to be restored in the user interface; and, by contrast, the user can request the data item to be restored in a batch, i.e., not specifically, when the user selects an entire data container to be restored, wherein the data container comprises the data item. As shown, in the case when it is determined that the restoration request is not a specific request, the process proceeds to 516 where the request data item is not restored. As also shown, in the case when it is determined that the restoration request is a specific request, process proceeds to 514. In some exemplary implementations, operations involved in 512 can be performed by a restore component the same as or substantially similar to the restore component 216 described and illustrated herein.

At 514, the requested data item is restored. In implementations, 514 can involve creating a new version of the data item on the data system and copy the content of the version currently stored by the backup system to the new version. In certain situations, the data item can be duplicated on the data system in doing so when the restoration request is a specific request. In some exemplary implementations, operations involved in 512 can be performed by a restore component the same as or substantially similar to the restore component 216 described and illustrated herein.

C. Encrypting and Compressing a Data Item

Figure 6:
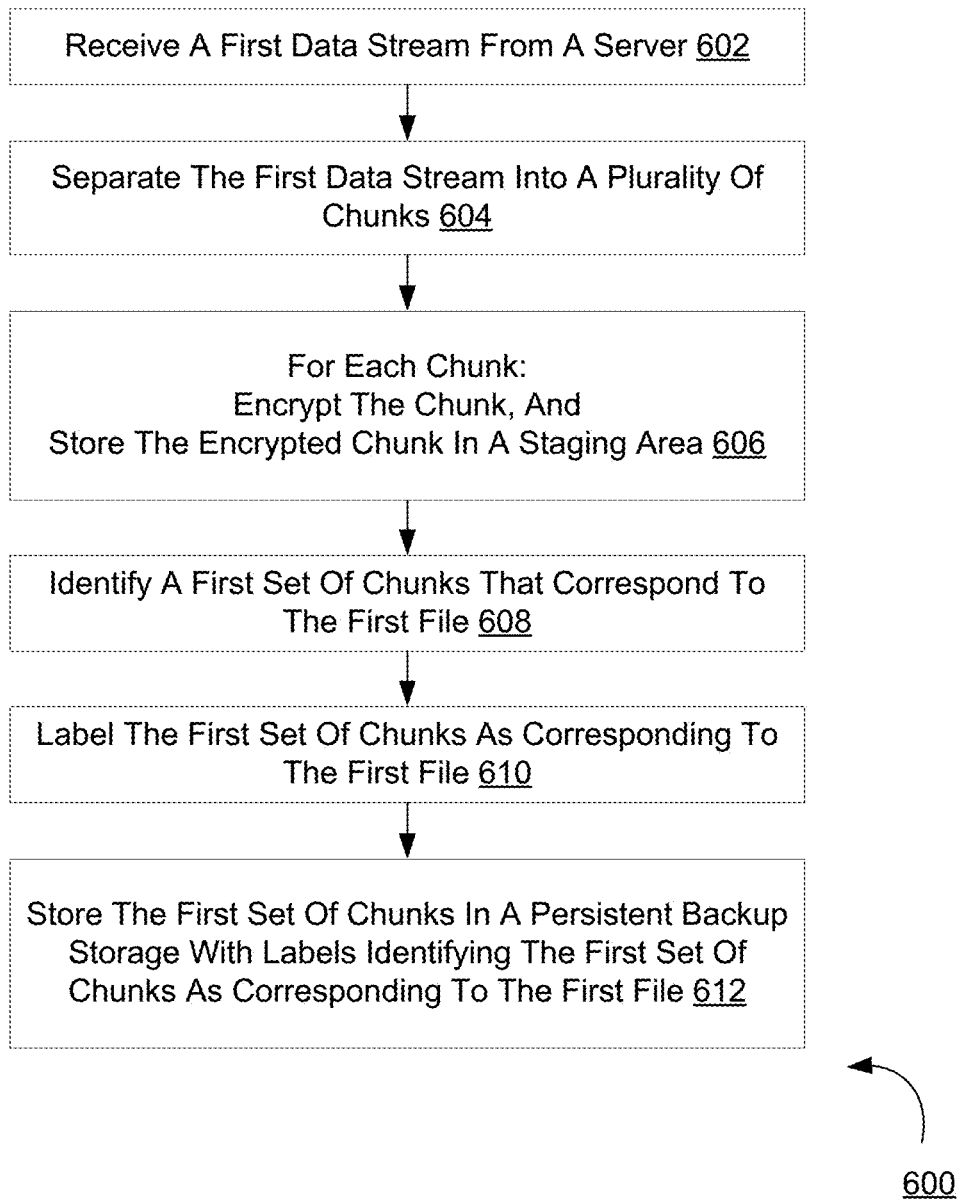
FIG. 6 illustrates an exemplary method for encrypting and storing a data item in accordance with the disclosure.

As mentioned above, in some implementations, a data item may be encrypted and compressed by the backup system 102 before it is stored in one or more of file storage 108*a-n*. FIG. 6 illustrates an exemplary method 600 for encrypting and storing a data item in accordance with the disclosure. In some embodiments, method 600 may be accomplished with one or more additional operations not described and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At 602, the backup system receives a first data stream from the server as part of a backup of a set of files stored on the server. The system may acquire a network stream that represents a file to be stored from the set of files, and as it is pulling in that stream in, it may break the stream up into chunks.

At 604, the system separates the first data stream into a plurality of chunks. For each of those chunks, the system may assign it an ID or label to know where it fits in to the whole stream.

At 606, for each chunk of the plurality of chunks, the chunk is encrypted, and the chunk is stored in a staging area. In one embodiment, the chunk compressed, encrypted, and then key hashed (e.g., using keyed-hash message authentication code (HMAC) of the encrypted chunk).

In one embodiment, the staging area is not in working memory, so as to support files that may have their combined chunk size far exceed working memory.

At 608, a first set of chunks is identified that correspond to the file to be stored. When all the blocks are finished being copied, a request can be made to the storage system of the staging area, where the request indicates the set of blocks that make up the single file. In one implementation, the storage system is Azure blob storage.

At 610, the first set of chunks are labeled as corresponding to the file to be stored onto one or more file storage 108a-n. For example, the first set of chunks can be stored on a number of different file storage 108a-n. In this way, a security can be achieved such that in case when one or few of file storage 108a-n are compromised, an intruder will not be able to assemble the entire file with the partial chunks of the files stored on the compromised file storage.

At 612, the first set of chunks and the corresponding hashes are stored in a persistent backup storage with the labels identifying the first set of chunks as corresponding to the first file.

D. User Interfaces

FIG. 7A illustrates an exemplary interface 700 enabling a user to initiate a search for one or more data items matching a search criteria specified by the user. In some implementations, the interface 700 can be provided by interface component 204 and implemented on a client computer, such as client computer 110a or 110n. As shown, interface 700 can comprise various controls, such as a search input box 702, a search button 704, a select button 706, a dropdown menu 708 and/or any other controls. The search input box 702 can be used to enable the user to specify a search text string indicating one or more search criteria. For example, the search criteria can indicate email messages with particular content from a particular sender.

The search button 704 can be used to enable the user to initiate a search request with the search criteria specified in the input box 702 to be performed. The dropdown menu 708 can be used to enable the user to select one or more types of data items to be searched using the search criteria. For example, the first data item type as shown can be email message, the second data item type can be calendar items, the third data item type can be task items, and nth data item type can be files. The select button 706 can be used to enable the user to select a particular data item type for the search request. For example, the user can select the email message such that the search request is for email messages matching the search criteria specified in the search input box 702.

FIG. 7B illustrates another example of interface 700 enabling a user to restore one or more data items on the data system. In this example, the interface 700 shown results from the search initiated by the interface shown in FIG. 7A. As shown, the interface 700 can comprise a metadata information display area 712. The display area can be configured to display metadata for data items that match the search criteria specified by the user in the input box 702, such as the data items 714a-n. As described above, the metadata displayed in area 712 can be provided by the backup system 102 via the search and restore server 104. As also shown, the user can be enabled to select one or more items displayed in the area 712, such as the first data item 714a and 714b as indicated by the dotted box. After selecting the desired data items for restoration, the user can be enabled to initiate a restoration request to restore the selected data items by acting on restore button 710.

III. Computer System

Figure 8:
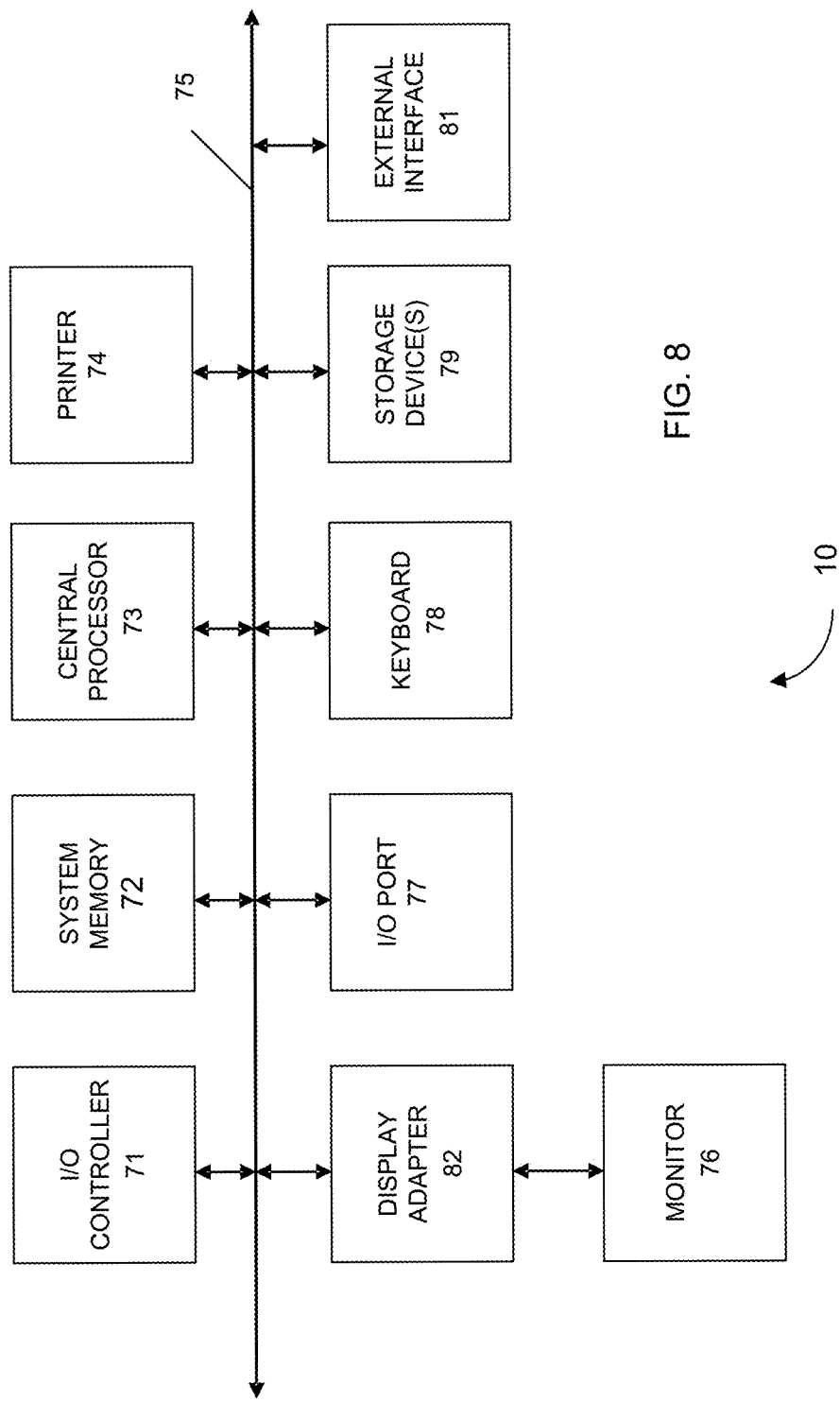
FIG. 8 shows a block diagram of an example computer system usable with system and methods according to embodiments of the present invention.

Any of the computer systems mentioned herein may utilize any suitable number of subsystems. Examples of such subsystems are shown in FIG. 8 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 8 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method of using a server for restoring data items to a data system from a backup system, the method being performed by the server and comprising:
    receiving, over a network from the data system, from the backup system, metadata information for each of a plurality of data items, wherein the metadata information provides a summary about the data item relating to a content of the data item;
    storing the metadata information in a memory of the server;
    providing, over the network to a client computer, a user interface that enables a user to specify one or more criteria for initiating a request to search the metadata information for one or more matching data items;
    performing a search of the metadata information to identify the one or more matching items that match the one or more criteria;
    obtaining a result set of the search, the result set including a first data item having first metadata information;
    providing the first metadata information to the client computer for presentation to the user;
    receiving, from the client computer, a restoration request indicating to restore the first data item to the data system;
    in response to the restoration request, obtaining, from the data system, first header information for the first data item, wherein the header information provides a description about the first data item;
    comparing the first metadata information with the first header information;
    determine whether a version of the first data item is to be restored from the backup system onto the data system based on a result of the comparison of the first metadata information regarding the first data item to the first header information; and
    when the version of the first data item is determined to be restored on the data system, sending an instruction to the backup system to effectuate restoration of the version of the first data item on the data system.

2. The method of claim 1, wherein the determination whether to restore the first data item on the data system comprises determining whether the first data item exists on the data system.

3. The method of claim 2, wherein,
when it is determined that the first data item does not exist on the data system, the first data item is determined to be restored on the data system.

4. The method of claim 2, further comprising:
when it is determined that the first data item exists on the data system:
  determining whether the restoration request from the user is a specific request or a batch request;
  when the restoration request from the user is determined as being the specific request, the first data item is determined to be restored on the data system; and
  when the restoration request from the user is determined as being the batch request, the first item is determined not to be restored on the data system.

5. The method of claim 4, wherein when the restoration request from the user is determined as being a specific request and the first data item is determined to be restored on the data system, the restoration of the first data item on the data system is effectuated by duplicating the first item on the data system.

6. The method of claim 3, wherein effectuating the restoration of the first data item on the data system includes causing the backup system to transmit a copy of the first data item on the data system.

7. The method of claim 1, wherein the data system is an electronic mail server.

8. The method of claim 7, wherein the first data item includes at least one of an electronic mail message, a contact item, a calendar item, and a task item.

9. The method of claim 7, wherein the first data item includes a file item.

10. A server for restoring data items to a data system from a backup system, the server comprising one or more processors configured by machine-readable instructions to perform:
  receiving, over a network from the data system, from the backup system, metadata information for each of a plurality of data items, wherein the metadata information provides a summary about the data item relating to a content of the data item;
  storing the metadata information in a memory of the server;
  performing a search of the metadata information to identify the one or more matching items that match the one or more criteria;
  obtaining a result set of the search, the result set including a first data item having first metadata information;
  performing a search of the metadata information to identify the one or more matching items that match the one or more criteria, thereby obtaining a result set including a first data item;
  providing the first metadata information to the client computer for presentation to the user;
  receiving, from the client computer, a restoration request indicating to restore the first data item to the data system;
  in response to the restoration request, obtaining, from the data system, first header information for the first data item, wherein the header information provides a description about the first data item;
  comparing the first metadata information with the first header information;
  determine whether a version of the first data item is to be restored from the backup system onto the data system based on a result of the comparison of the first metadata information regarding the first data item to the first header information; and
  when the version of the first data item is determined to be restored on the data system, sending an instruction to the backup system to effectuate restoration of the version of the first data item on the data system.

11. The server of claim 10, wherein the determination whether to restore the first data item on the data system comprises determining whether the first data item exists on the data system.

12. The server of claim 11, wherein,
when it is determined that the first data item does not exist on the data system, the first data item is determined to be restored on the data system.

13. The server of claim 11, further comprising:
when it is determined that the first data item exists on the data system:
  determining whether the restoration request from the first user is a specific request or a batch request;
  when the restoration request from the user is determined as being a specific request, the first data item is determined to be restored on the data system; and
  when the restoration request from the user is determined as being the batch request, the first item is determined not to be restored on the data system.

14. The server of claim 13, wherein when the restoration request from the first user is determined as being a specific request and the first data item is determined to be restored on the data system, the restoration of the first data item on the data system is effectuated by duplicating the first item on the data system.

15. The server of claim 11, wherein effectuating the restoration of the first data item on the data system includes causing the backup system to transmit a copy of the first data item on the data system.

16. The server of claim 10, wherein the data system is an electronic mail server.

17. The server of claim 16, wherein the first data item includes at least one of an electronic mail message, a contact item, a calendar item, and a task item.

18. The server of claim 16, wherein the first data item includes a file item.

* * * * *